(12) United States Patent
Roehnelt et al.

(10) Patent No.: US 9,400,287 B2
(45) Date of Patent: Jul. 26, 2016

(54) STRESS REDUCTION COMPONENTS FOR SENSORS

(71) Applicant: Honeywell International Inc., Morristown, NJ (US)

(72) Inventors: Ryan Roehnelt, Kenmore, WA (US); Michael Jarvis, Kenmore, WA (US); Galen P. Magendanz, Issaquah, WA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/861,936

(22) Filed: Sep. 22, 2015

(65) Prior Publication Data

US 2016/0011227 A1    Jan. 14, 2016

Related U.S. Application Data

(63) Continuation of application No. 13/656,600, filed on Oct. 19, 2012, now Pat. No. 9,164,117.

(51) Int. Cl.
*G01P 15/00* (2006.01)
*G01P 1/00* (2006.01)
*G01P 15/125* (2006.01)
*G01P 15/13* (2006.01)

(52) U.S. Cl.
CPC ............... *G01P 1/006* (2013.01); *G01P 15/125* (2013.01); *G01P 15/132* (2013.01)

(58) Field of Classification Search
CPC ..................................................... G01P 15/125
USPC ....................................................... 73/514.23
See application file for complete search history.

(56) References Cited

U.S. PATENT DOCUMENTS 3,702,073 A * 11/1972 Jacobs ................. G01P 15/132
                                                            73/514.23
4,182,187 A *  1/1980 Hanson .................. G01L 1/086
                                                             177/210 C (Continued)

FOREIGN PATENT DOCUMENTS

| EP | 2090892 A1 | 8/2009 |
| WO | 9119988 A1 | 12/1991 |
| WO | 9624853 A1 | 8/1996 |

OTHER PUBLICATIONS

Search Report from counterpart European application No. 13188400.9, dated Dec. 16, 2013, 3 pp.

(Continued)

*Primary Examiner* — Hezron E Williams
*Assistant Examiner* — Mark A Shabman
(74) *Attorney, Agent, or Firm* — Shumaker & Sieffert, P.A.

(57) ABSTRACT

An accelerometer device for reducing stress on the sensor resulting from temperature extremes and multiple coefficients of thermal expansion. An exemplary accelerometer device includes upper and lower stators and a reed. The reed includes a support ring and a paddle that is flexibly connected to the support ring. The support ring includes a ring section and at least two mounting devices. The mounting devices are at least partially mechanically isolated from the ring section. The ring section flexibly receives the paddle. The mounting devices include a pad area and a neck area that connect the pad area to the ring section. The neck area includes a width dimension that is narrower than a diameter dimension of the pad area.

20 Claims, 7 Drawing Sheets

(56) References Cited

U.S. PATENT DOCUMENTS

| | | | | |
|---|---|---|---|---|
| 4,250,757 A * | 2/1981 | Hanson | G01D 5/24 | 73/514.23 |
| 4,766,768 A * | 8/1988 | Norling | G01P 15/097 | 73/497 |
| 4,872,342 A * | 10/1989 | Hanson | G01P 15/0888 | 29/595 |
| 4,932,258 A * | 6/1990 | Norling | G01P 15/132 | 73/497 |
| 5,024,089 A * | 6/1991 | Norling | G01P 15/132 | 73/497 |
| 5,085,079 A * | 2/1992 | Holdren | G01P 15/132 | 73/514.13 |
| 5,090,243 A * | 2/1992 | Holdren | G01P 15/132 | 73/431 |
| 5,289,719 A * | 3/1994 | Egley | G01P 1/006 | 73/497 |
| 5,644,083 A * | 7/1997 | Newell | G01P 1/003 | 73/514.13 |
| 5,763,779 A * | 6/1998 | Foote | G01P 15/132 | 73/497 |
| 9,164,117 B2 * | 10/2015 | Roehnelt | G01P 1/006 | |
| 2009/0205424 A1 * | 8/2009 | Roehnelt | G01P 15/132 | 73/514.31 |
| 2009/0235745 A1 * | 9/2009 | Dwyer | G01P 15/132 | 73/514.23 |
| 2009/0293616 A1 | 12/2009 | Lin et al. | | |
| 2009/0321857 A1 | 12/2009 | Foster et al. | | |
| 2014/0109673 A1 | 4/2014 | Roehnelt et al. | | |

OTHER PUBLICATIONS

Examination Report from counterpart European Application No. 13188400.9. dated Jan. 13, 2014, 5 pp.

Response to Article 94(3) EPC Communication dated Jan. 13, 2014, from counterpart European Application No. 13188400.9, dated May 6, 2014, 7 pp.

Prosecution History from U.S. Appl. No. 13/656,600, dated Feb. 13, 2015 through Jun. 19, 2015, 24 pp.

* cited by examiner

STRESS REDUCTION COMPONENTS FOR SENSORS

This application is a continuation of U.S. patent application Ser. No. 13/656,600 by Roehnelt et al., filed Oct. 19, 2012 and entitled, "STRESS REDUCTION COMPONENTS FOR SENSORS," the entire content of which is hereby incorporated by reference.

BACKGROUND OF THE INVENTION

As shown in FIGS. 1 and 2, a reed is mounted to a magnetic circuit by compression. As temperature changes the much-thicker magnetic circuit component, it deforms the reed into a novel shape, which causes the paddle to deflect. Additionally, any slip of the mounting points causes error.

The slip potential increases at high temperature, as the clamping force decreases and shear stress between the reed and the magnetic circuit increases.

The coefficient of thermal expansion (CTE) (α) of the excitation ring 13 is higher than α of the attached reed 16. As the excitation ring 13 is also considerably stronger, it will pull mounting points 18 radially, which will also cause a compression or tensile stress as the excitation ring 13 attempts to move the mounting points 18 to a smaller or larger radius.

Because the fused silica (commonly referred to as quartz) of the reed 16 is a highly elastic material, the reed 16 does not plastically deform to accommodate the metal of the excitation ring 13. Instead, some other mechanism of stress accommodation occurs, Possibilities are: a) slip of the mounting points 18; b) local yielding of metal part; and c) the rim of the reed 16 becomes an oval shape, which forces the paddle 19 out of plane. Any one of these, or a combination thereof, will cause sensor error that is made worse by temperature extremes.

FIGS. 1 and 2 illustrate an accelerometer that includes the asymmetric flexure arrangement of the present invention. The accelerometer measures acceleration along sensing axis SA, and includes stator, reed, and mounting members 18. The reed is held between mounting member 18 and stator, and has a coil positioned on its upper surface. The excitation ring (e-ring) comprises stator 13, magnet and pole piece. The e-ring is shaped so that the coil occupies a comparatively narrow gat between pole piece and stator 13, to provide the force balancing function well known to those skilled in the art.

The reed has an overall disk-like shape, and includes annular support ring and paddle connected to one another via a pair of flexures between Which an opening is farmed. For most of its perimeter, the paddle is separated from the support ring by a circular gap. Raised mounting pads 18 are located at approximately equally spaced positions around support ring.

SUMMARY OF THE INVENTION

The present invention reduces stress on the sensor resulting from temperature extremes and multiple coefficients of thermal expansion and also to assist in maintaining co-axiality between sense elements and the return path. The present invention is particularly useful for down hole use Where the environment requires use of materials with non-ideal coefficient of thermal expansion match. The present invention reduces the stress on the sense element, increasing accuracy over temperature by including flexure(s) for the mounting points between the sense element and the return path of a quartz flexure accelerometer. The arrangement of the flexures not only reduces stress but assists in maintaining co-axiality between the sense element and the return path.

An exemplary accelerometer device includes upper and lower stators and a reed. The inwardly facing surface of a least one stator includes a bore within which is positioned a permanent magnet capped by a pole piece. The reed includes a support ring and a paddle that is flexibly connected to the support ring via flexures that are compliant out of plane. The support ring includes a ring section and at least two mounting devices. The mounting devices are at least partially mechanically isolated from the ring section.

In one aspect of the invention, the mounting devices include a pad area and a neck area that connect the pad area to the ring section. The neck area includes a width dimension that is narrower than a diameter dimension of the pad area.

In another aspect of the invention, the pad area and the neck area are defined by an outer edge of the reed and a cavity linking the first and second sides.

In still another aspect of the invention, the pad area and the neck area are defined by an outer edge of the reed, a first cavity linking the first and second sides and a second cavity linking the first and second sides. The first and second cavities are at least partially circular.

BRIEF DESCRIPTION OF THE DRAWINGS

Preferred and alternative embodiments of the present invention are described in detail below with reference to the following drawings:

FIGS. 4-1 and 4-2 illustrate partial cross-sectional views of a stress relief structure formed into a reed of an accelerometer in accordance with an embodiment of the present invention;

FIGS. 6-1 and 6-2 illustrate another isolation structure formed into the reed of an accelerometer in accordance with an embodiment of the present invention;

FIGS. 7-1 and 7-2 illustrate different embodiments for the bottom (6 o'clock) positioned attachment features for the devices shown in FIGS. 4-1 and 6-1;

FIG. 8-1 illustrates a partial cross-sectional view of an isolation device formed within a stator of a paddle-type accelerometer;

FIG. 8-2 illustrates a cross-sectional view along a longitudinal axis of the accelerometer, partially shown in FIG. 8-1;

FIG. 9-1 illustrates a partial cross-sectional view of an isolation device formed within a stator of a paddle-type accelerometer; and FIG. 9-2 illustrates a cross-sectional view along a longitudinal axis of the accelerometer, partially shown in FIG. 9-1.

DETAILED DESCRIPTION OF THE INVENTION

The present invention provides stress isolation/reduction features for avoiding plastic deformation, slip, or bending of a reed of an accelerometer e.g., Q-Flex made by Honeywell, Inc.).

Figure 3:
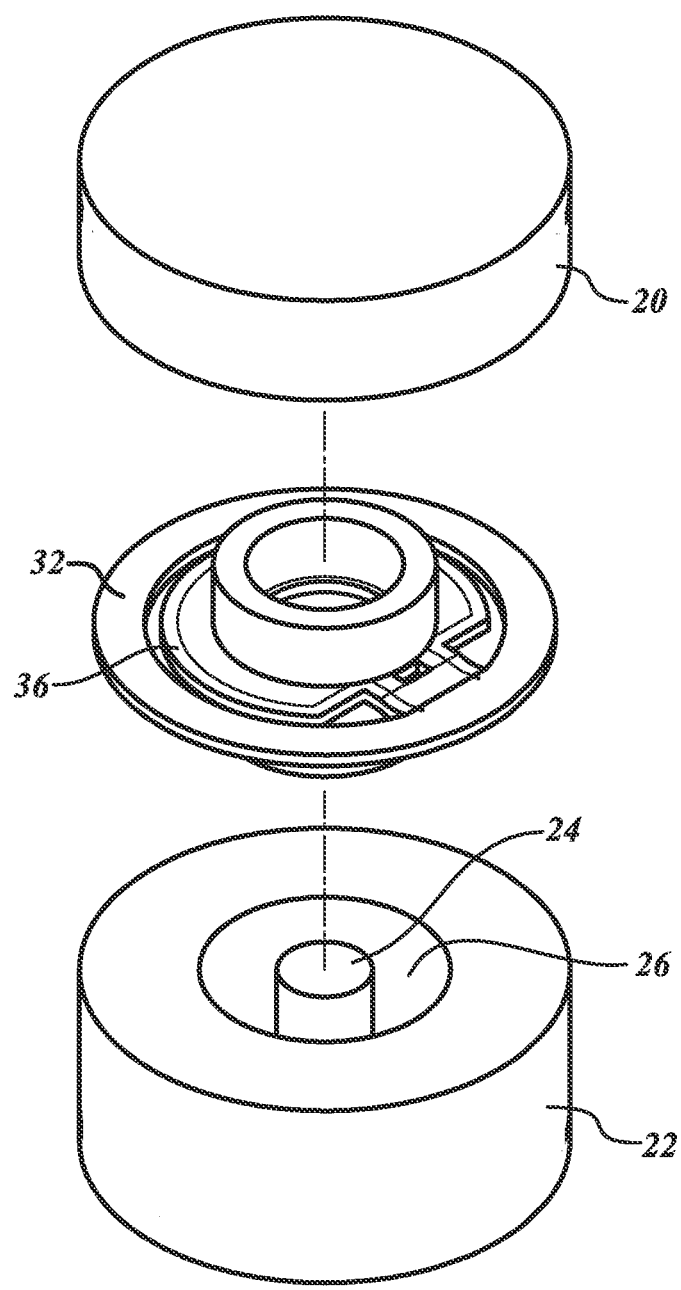
FIG. 3 illustrates a blown-up view of an accelerometer that uses the various stress relief components of the present invention.

FIG. 3 illustrates a force rebalance accelerometer where the features of the present invention are used. This accelerometer includes an upper stator 20 and a lower stator 22. The inwardly facing surface of a least one stator includes a bore within which is positioned a permanent magnet capped by a pole piece, as illustrated by pole piece 24 within a bore 26.

Also shown is reed assembly that is mounted between the upper and lower stators. The reed assembly includes a reed that includes an outer annular support ring 32 and a paddle 36 supported from the support ring by flexures. The reed is preferably fabricated from a single piece of fused silica. The support ring 32 includes three mounting locations. When the accelerometer is assembled, the mounting pads contact the upper and lower stators to provide support for the reed assembly.

A capacitor plate is deposited on the upper surface of the paddle 36, and a similar capacitor plate (not shown) is deposited on the lower surface of the paddle. The capacitor plates cooperate with the inwardly facing surfaces of upper and lower stators 20 and 22 to provide a capacitive pick-off system. Also mounted on either side of the paddle 36 are coil forms on which force-rebalance coils are mounted. As is well understood in the served instrument art, coils cooperate with the permanent magnets in the stators and with a suitable feedback circuit to retain the paddle 36 at a predetermined position with respect to the support ring 32. Thin film pick-off leads, and similar leads (not shown) on the lower surface of the reed, provide electrical connections to the capacitor pick-off plates and force-rebalance coils.

In the design of an accelerometer of the type shown in FIG. 3, it is nearly impossible to use the same material for all of the different components. For example, the reed is preferably composed of fused quartz, the coil is preferably composed of copper, and coil form (if used) is preferably made from aluminum. As a result, there will invariably be mismatches in the coefficients of thermal expansion (CTE) of adjacent components. Such mismatches can deform the components and cause errors in a number of different ways, depending on the type of suspension and displacement pick-off method used.

The coil forms are typically mounted directly to the paddle 36 with a compliant elastomer. The mismatch in CTE between aluminum and fused quartz is large, and the compliant elastomer layer does not relieve all of the stress at this interface. The remaining stresses that are not cancelled by the opposing coil can deform the capacitor pick-off plates or the flexures. Either of these deformations can cause a bias in the accelerometer's output. In addition, distortions that change the position of the coil windings can cause scale-factor errors. These error sources are even more significant in a design in which only a single force-rebalance coil is used, because of the asymmetry of the resulting stress applied to the paddle.

Figure 1:
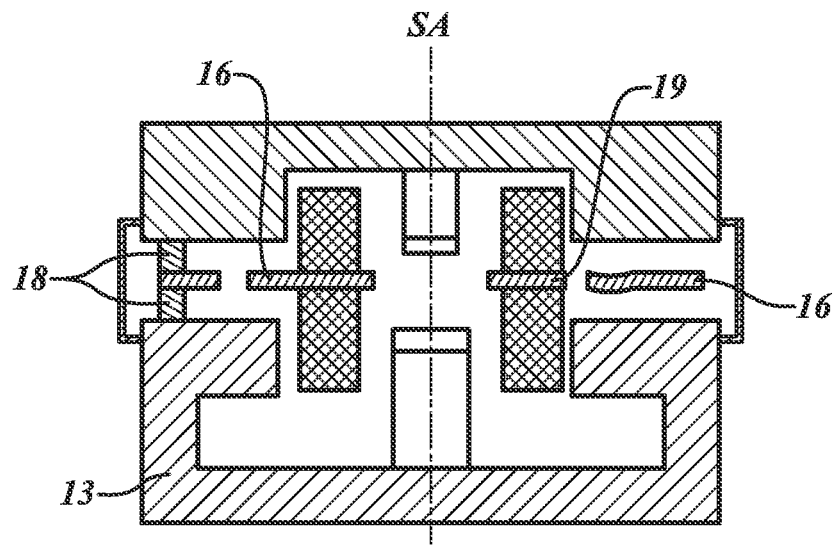
FIGS. 1 and 2 illustrate cross-sectional views of a paddle-type accelerometer formed in accordance with the prior art.
Figures 1, 4:
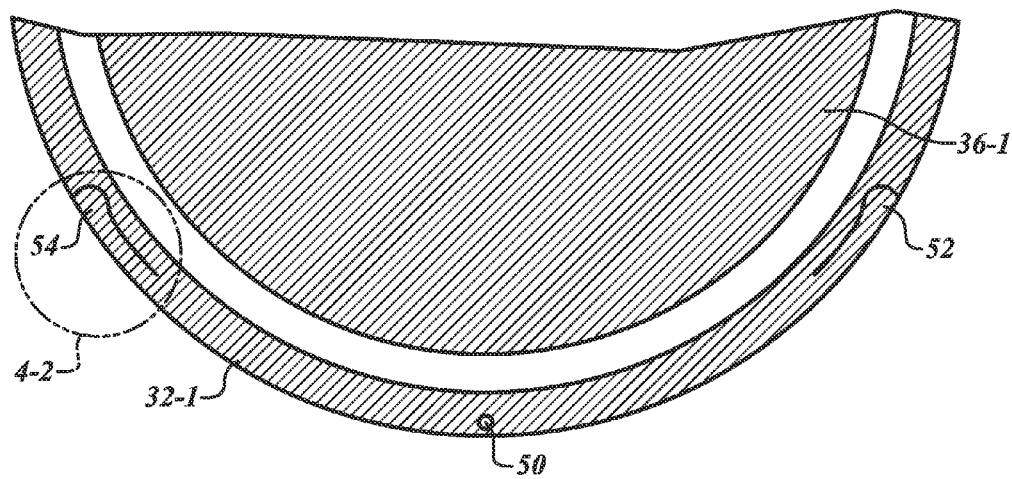
Figures 2, 4:
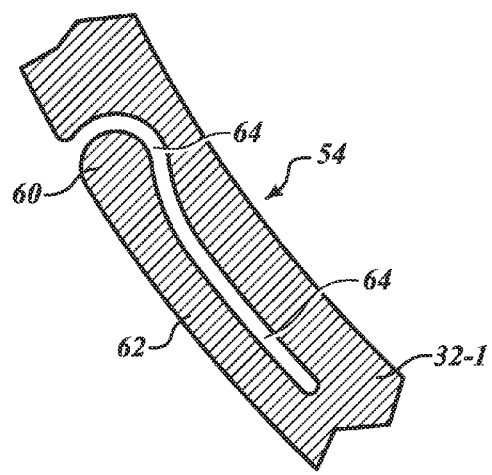

As shown in FIG. 4-1, a support ring 32-1 of the reed of an accelerometer includes multiple locations for mounting the support ring 32-1 to the other components of the accelerometer (stators). First mounting pads 50 mount to either side of the support ring 32-1, The mounting pads 50 attach to the surface of the upper and lower stators. The mounting pads 50 are located along the support ring 32-1 approximately opposite flexures (not shown) for flexibly mounting a paddle proof-mass 36-1 to the support ring 32-1.

Figure 2:
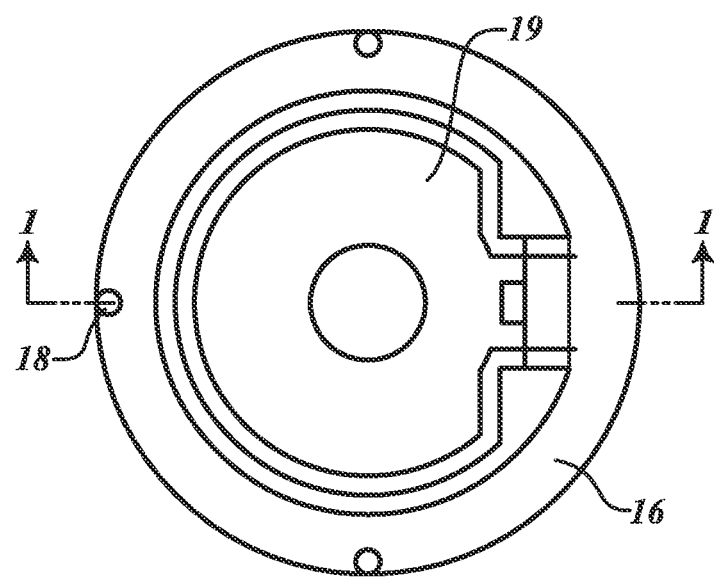

Mounting devices 52 and 54 are located along the support ring 32-1 approximately equidistant from the first mounting device 50. FIG. 4-2 illustrates a closer view of one of the mounting devices 54. The mounting device 54 includes a mounting area 60, The mounting area 60 (both sides) are raised above the rest of the support ring 32-1. The raised area 60 are attached to the upper and lower stators, The mounting area 60 is formed by a cavity 64 that is etched around the mounting area 60 to isolate the mounting area 60 from the support ring 32-1, except for a neck section 62 that attaches the mounting area 60 to the support ring 32-1. The cavity 64 passes through the entire thickness of the support ring 32-1. The cavity could be at least partially formed by machining or etching.

Figure 5:
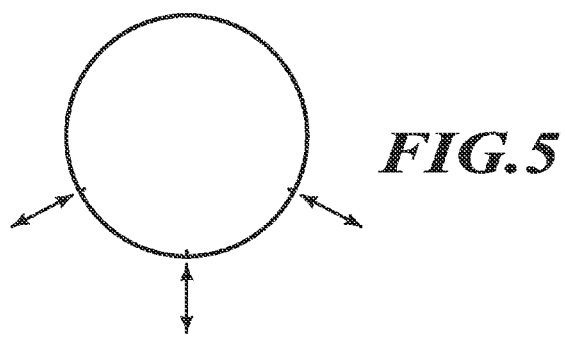
FIG. 5 illustrates thermal expansion induced force vectors experienced by mounting points of the accelerometer shown in FIGS. 4-1 and 4-2.

As shown in FIG. 5, the arrows indicate the direction in which stresses are applied to each of the mounting locations of the accelerometer shown in FIG. 4-1. These forces are due to a stress caused by differential thermal expansion of the parts of the accelerometer. The isolation mounts 52 and 54 (and mount 50 if it includes an isolation feature (FIGS. 7-1, 7-2) mitigate some of the stresses shown by these arrows. The isolation mounts 52 and 54 allow the attached stators to expand or contract, without unduly affecting the support ring 32-1.

Figures 1, 6:
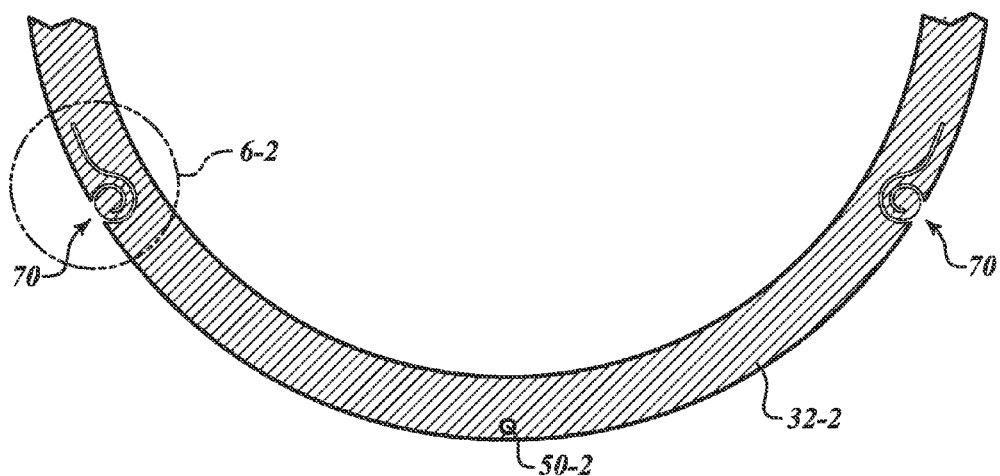
Figures 2, 6:
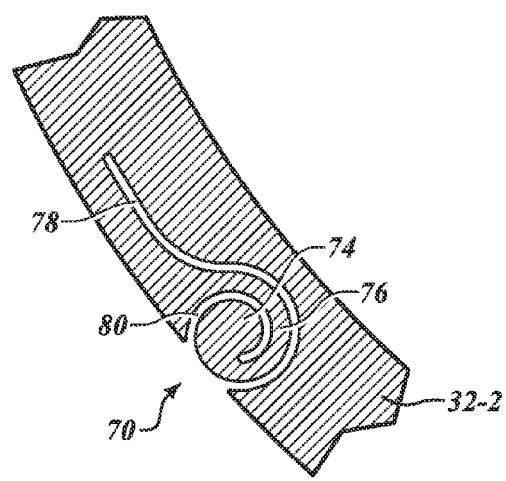

As shown in FIGS. 6-1 and 6-2, in one embodiment, a support ring 32-2 includes a first attachment point 50-2, similar to first mounting device 50, described and shown in FIGS. 4-1 and 5. The support ring 32-2 also includes spiral attachment devices 70, located equidistant from the first attachment point 50-2. Each of the spiral attachment devices 70 include an attachment area 74 that allows for mounting devices (not shown) to be attached on either side of the mounting area 74. The mounting pads then attach to the respective upper or lower stator. The spiral attachment device 70 includes a first cavity 80 that passes all the way through the support ring 32-2. The first cavity 80 starts at approximately a first radial projecting from the center of the mounting area 74. The first cavity 80 curves in a counter-clockwise manner around the attachment area 74 and exits the support ring 32-2 at a second radial that is at least 270° from the first radial. A second cavity 78 begins at the edge of the support ring 32-2 at a third radial that is somewhere between the first and second radials. The second cavity 78 proceeds in a counterclockwise manner around the attachment area 74 and around the first cavity 80 until it reaches a location at a fourth radial that is between the first and second radials in a direction away from the first attachment point 50-2. The second cavity 78 then straightens out or follows the curvature of the edge of the support ring 32-2. Thus, the second cavity 78 forms a spiral neck 76 that attaches the attachment area 74 to the support ring 32-2. The spiral attachment devices 70 allow for expansion and contraction of the stators while limiting stresses experienced at the support ring 32-2.

Figures 1, 7:
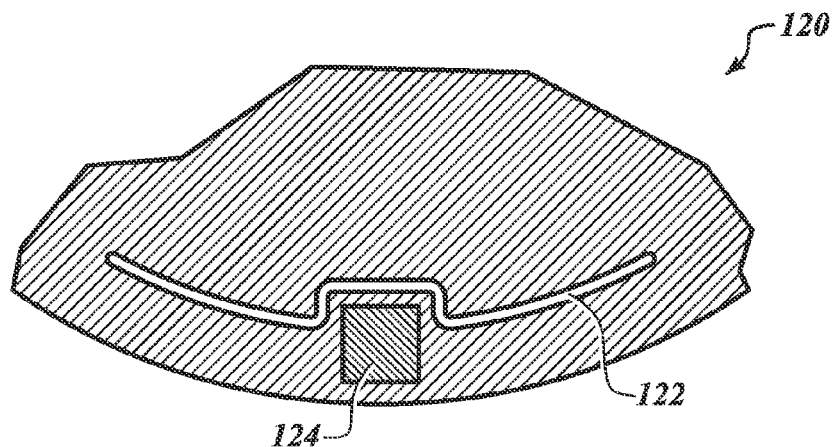
Figures 2, 7:
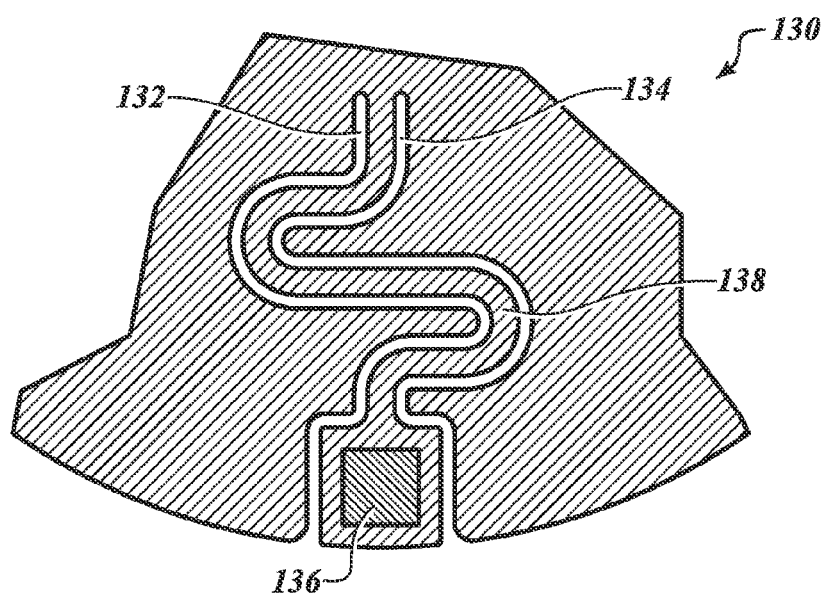

FIG. 7-1 shows an embodiment of a bottom (6 o'clock) positioned attachment point 120 (50 or 50-2 FIGS. 4-1, 6-1). The attachment point 120 includes a cut out 122 that isolates a raised area 124 from the ring.

FIG. 7-2 shows an embodiment of a bottom (6 o'clock) positioned attachment point 130 (50 or 50-2 FIGS. 4-1, 6-1). The attachment point 130 includes two cut outs 132, 134 that isolate a raised area 136 and a shaft 138 from the ring. The shaft 138 zig-zags in a rounded and/or square pattern. Other shapes for the bottom (6 o'clock) positioned attachment point are used provided rotation of the reed is minimal over temperature changes.

Figures 1, 8:
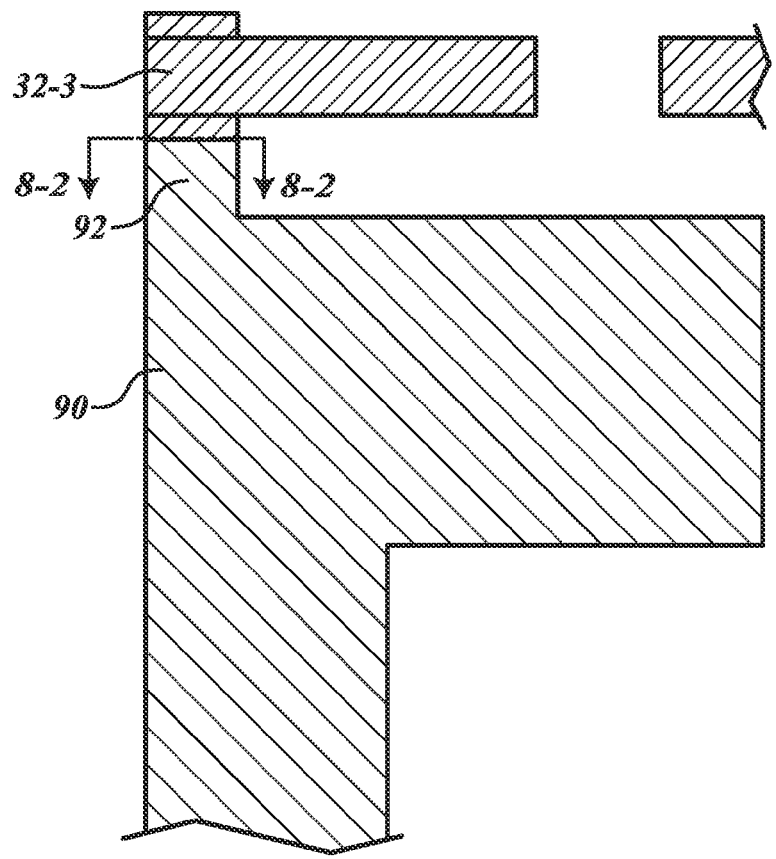
Figures 2, 8:
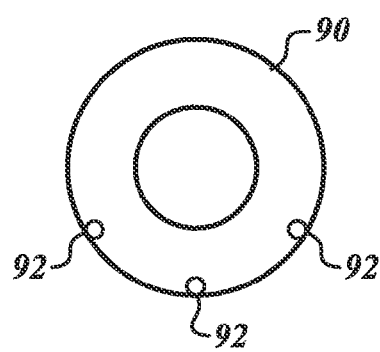

As shown in FIGS. 8-1 and 8-2, a lower stator 90 has been machined to produce a plurality of pillars 92. In one embodiment, the upper stator includes matching features to those shown on the lower stator 90. The pillars 92 are located at approximately the circumferential edge of the stator 90. The pillars 92 attach to opposing raised areas of a support ring 32-3 of the accelerometer reed or attach to mounting pads located on the support ring 32-3 of the accelerometer reed. The pillars 92 provide stress relief to the metal parts of the accelerometer. The stator 90 is machined away to expose the resulting pillar 92. The taller the pillar 92 and the smaller the cross section, the greater the compliance of the pillar. An exemplary pillar includes compliance in both the radial and circumferential directions, which could be varied by the shape and cross section of the pillar.

Figures 1, 9:
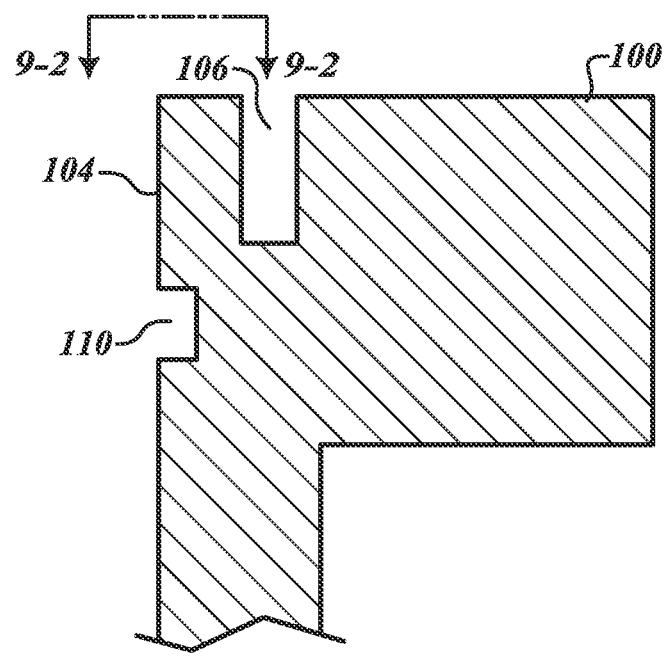
Figures 2, 9:
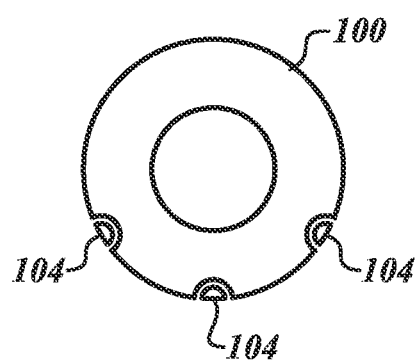

FIGS. 9-1 and 9-2 illustrate an embodiment in which a stator 100 includes a pillar 104 that has been machined from the stator material at the circumference of the stator at a mounting surface. The pillar 104 is defined by a first curved cavity 106. An exemplary depth of the cavity 106 is 0.1-0.12". The first curved cavity 106 is machined out of the metal (e.g., Invar) that forms the stator 100.

In an alternate embodiment, a second cavity 110 is etched below the pillar 104 from an exterior side of the stator 100. The second cavity 110 provides more flexibility of the pillar 104.

In one embodiment, the pillars 92, 104 are used at all mounting locations.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows.

What is claimed is:

1. An accelerometer device measuring celebration along a sensing axis, the accelerometer device comprising:
    a first stator and a second stator, wherein at least one of the first stator or the second stator comprises a magnet and a pole piece, and wherein the first stator comprises a plurality of mounting pillars; and
    a reed comprising:
        a support ring comprising a plurality of mounting devices on the support ring, and
        a paddle flexibly connected to the support ring, wherein the support ring is configured to flexibly receive the paddle,
    wherein the reed is configured to mount between the first stator and the second stator, wherein each respective mounting device of the plurality of mounting devices are configured to mount to a respective mounting pillar of the plurality of mounting pillars, wherein the plurality of mounting pillars are configured to at least partially physically isolate the reed from the first stator.

2. The device of claim 1, wherein the second stator comprises a second plurality of mounting pillars, wherein each respective mounting device of the plurality of mounting devices are configured to mount to a respective mounting pillar of the second plurality of mounting pillars, and wherein the second plurality of mounting pillars are configured to at least partially physically isolate the reed from the second stator.

3. The device of claim 1, wherein le first stator defines a major surface, wherein the sensing axis is perpendicular to the major surface, and wherein each mounting pillar of the plurality of mounting pillars extends from the first stator along the sensing axis.

4. The device of claim 3, wherein each mounting pillar of he plurality of mounting pillars extends from the major surface.

5. The device of claim 3, wherein each mounting pillar of the plurality of mounting pillars is defined by a first cavity machined into the major surface in a direction of the sensing axis.

6. The device of claim 5, wherein the first cavity comprises a curved cavity.

7. The device of claim 6, wherein the first cavity defines a cavity depth measured in the direction of the sensing axis of about 0.1 to about 0.12 inches.

8. The device of claim 5, wherein each mounting pillar of the plurality of mounting pillars is defined by a second cavity machined into the first stator substantially perpendicular to the sensing axis.

9. The device of claim 3, wherein the plurality of mounting pillars are defined by an outer edge of the first stator.

10. The device of claim 1, wherein the at least two mounting devices of the plurality of mounting devices are at least partially mechanically isolated from the support ring, the at least two mounting devices comprising:
    a mounting area configured to be mounted to the respective pillar of the plurality of pillars and the second stator; and
    a neck section configured to connect the mounting area to the support ring, wherein the neck section has a width dimension in a radial direction of the support ring that is less than a width dimension of the mounting area in the radial direction of the support ring.

11. The device of claim 10, wherein the mounting area and the neck section are defined by an outer edge of the reed and a cavity cut through a thickness of the reed.

12. The device of claim 10, wherein the mounting area and the neck section are defined by an outer edge of the reed and a first cavity and a second cavity cut through a thickness of the reed.

13. The device of claim 12, wherein the first cavity and the second cavity are at least one of partially circular, partially spiral, or partially zigzag shaped.

14. The device of claim 10, wherein the neck section is at leas one of partially spiral, partially circular, or partially zigzag shaped.

15. A method of reducing stress on an accelerometer, the method comprising:
    mounting a reed to a first stator, wherein the first stator comprises a plurality of mounting pillars, and wherein the reed comprises:
        a support ring comprising a plurality of mounting devices on the support ring; and
        a paddle flexibly connected to the support ring, wherein the support ring is configured to flexibly receive the paddle, wherein each respective mounting device of the plurality of mounting devices are configured to mount to a respective mounting pillar of the plurality of mounting pillars, wherein the plurality of mounting pillars are configured to at least partially physically isolate the reed from the first stator; and
    mounting a second stator to the reed to form an accelerometer, wherein the reed mounts between the first stator and the second stator, and wherein the accelerometer is configured to measure an acceleration along a sensing axis.

16. The method of claim 15, wherein the first stator defines a major surface, wherein the sensing axis is perpendicular to the major surface, the method further comprising:
    partially machining the major surface of the first stator to form the plurality of mounting pillars that extend from the first stator along the sensing axis.

17. The method of claim 15, wherein the first stator defines a major surface, wherein the sensing axis is perpendicular to the major surface, the method further comprising:
    partially machining the major surface of the first stator to form a first plurality of cavities, wherein each cavity of the first plurality of cavities defines a mounting pillar of the plurality of mounting pillars.

18. The method of claim 17, wherein each cavity of the first plurality of cavities comprises a curved cavity having a cavity depth measured in the direction of the sensing axis of about 0.1 to about 0.12 inches.

19. The method of claim 17, further comprising:
partially machining the first stator to form a second plurality of cavities, wherein each cavity of the second plurality of cavities extends substantially perpendicular to the sensing axis and defines a respective mounting pillar of the plurality of mounting pillars.

20. The method of claim 15, further comprising;
cutting the support ring to define the plurality of mounting devices, wherein the plurality of mounting devices comprise:
a mounting area configured to be mounted to the respective pillar of the plurality of pillars and the second stator; and
a neck section configured to connect the mounting area to the support ring, wherein the neck section has a width dimension in a radial direction of the support ring that is less than a width dimension of the mounting area in the radial direction of the support ring.

* * * * *